H. S. HEICHERT.
APPARATUS FOR SUPPORTING GLASS CYLINDERS.
APPLICATION FILED FEB. 11, 1919.

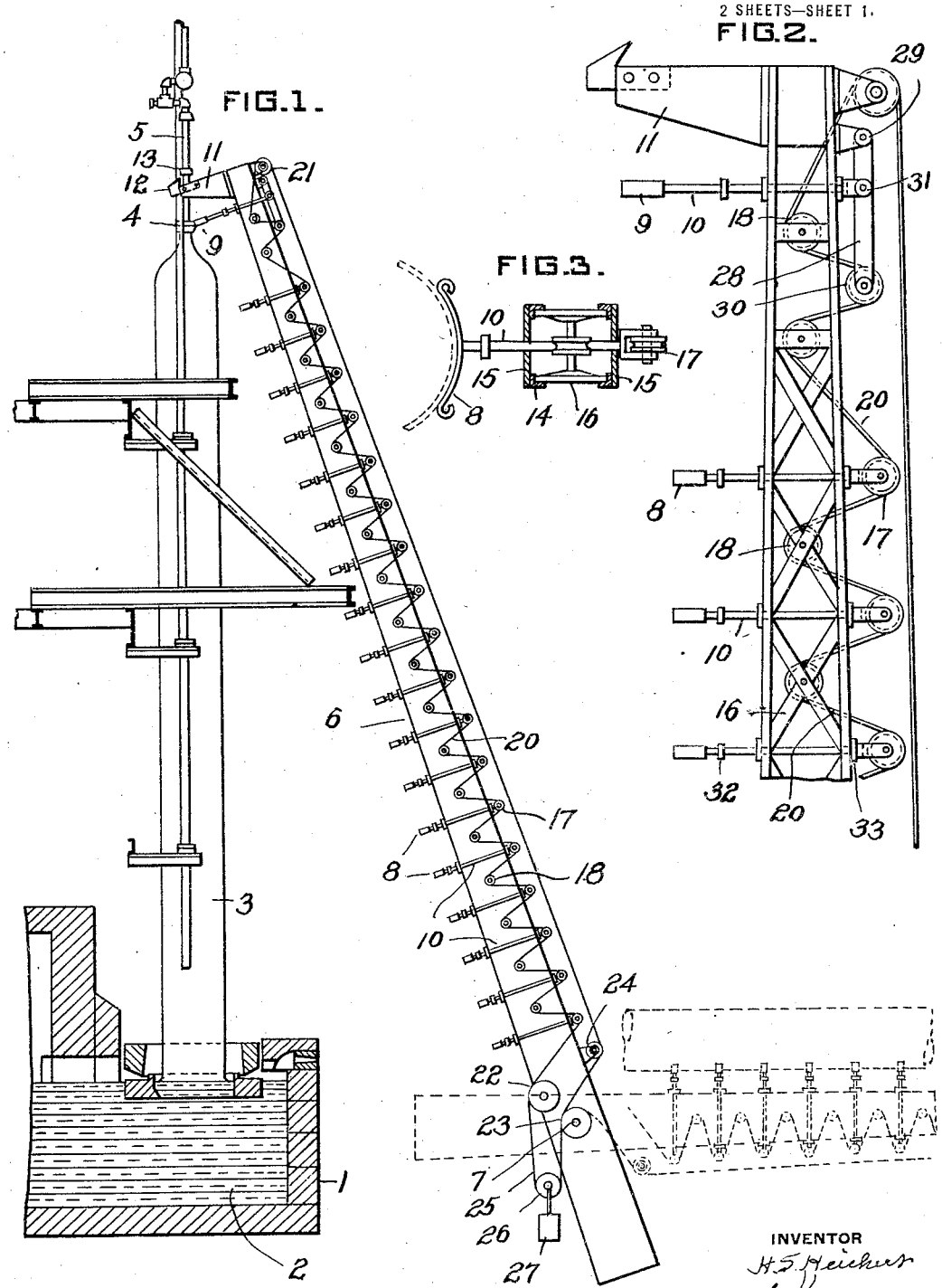

1,361,855.

Patented Dec. 14, 1920.
2 SHEETS—SHEET 2.

INVENTOR
Herman S. Heichert
by
James C. Bradley
Atty

UNITED STATES PATENT OFFICE.

HERMAN S. HEICHERT, OF PITTSBURGH, PENNSYLVANIA, ASSIGNOR TO PITTSBURGH PLATE GLASS COMPANY, A CORPORATION OF PENNSYLVANIA.

APPARATUS FOR SUPPORTING GLASS CYLINDERS.

1,361,855.  Specification of Letters Patent.  Patented Dec. 14, 1920.

Application filed February 11, 1919. Serial No. 276,261.

*To all whom it may concern:*

Be it known that I, HERMAN S. HEICHERT, a citizen of the United States, and a resident of Pittsburgh, in the county of Allegheny and State of Pennsylvania, have made a new and useful Invention in Apparatus for Supporting Glass Cylinders, of which the following is a specification.

Figure 4:
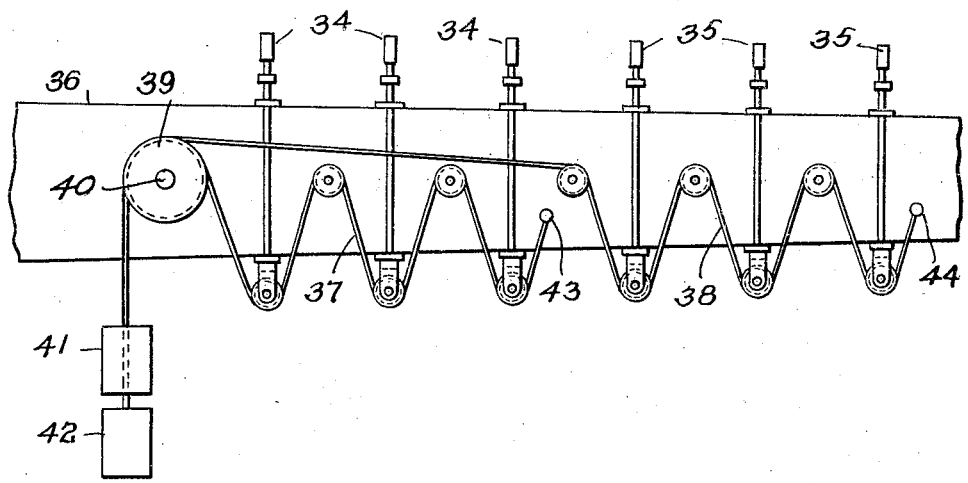
Figure 5:
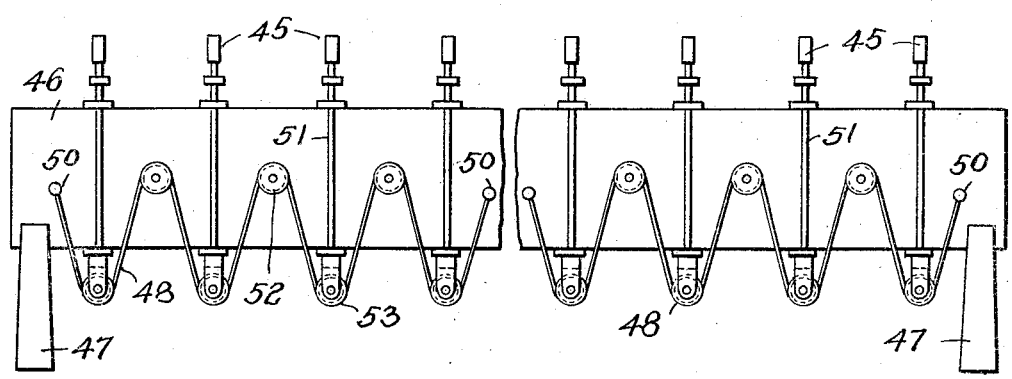

The invention relates to apparatus for taking down and otherwise supporting the glass cylinders formed in the manufacture of window glass. The invention has for its primary objects the provision of improved and simplified means for causing the cylinder supporting arms to engage the cylinder with uniform supporting pressure regardless of any lack of straightness in the cylinder or variations in the diameter thereof. The invention is illustrated as applied to a takedown apparatus but is applicable to any supporting frame for glass cylinders whether for use in taking down cylinders or supporting them in other relations. Certain embodiments of the invention are illustrated in the accompanying drawings, wherein:

Figure 1 is a partial side elevation and partial section of the apparatus as used, the dotted lines indicating the take down in lowered position. Fig. 2 is a side elevation on an enlarged scale of the upper end of the take down. Fig. 3 is a transverse section through the take down on the same scale as Fig. 2, and Figs. 4 and 5 are partial side elevations of modified forms of construction.

Referring first to the general arrangement of apparatus as shown in Fig. 1, the reference numeral 1 indicates a drawing extension or tank carrying a body of molten glass 2; 3 is a glass cylinder which has been drawn, such cylinder being supported at its upper end by means of the bait 4 mounted upon suitable carriage (not shown) and provided with a hollow handle 5, by means of which air is supplied to the cylinder; 6 is the take down frame, pivotally mounted at 7 and adapted to be swung from full line to dotted line position by means of a suitable motor and operating mechanism (not shown). 8 are curved arms (Fig. 3) adapted to engage and support the glass cylinder during the taking down and cutting up operation; 9 is an arm similar to the arms 8 for engaging the bait itself, and 10 are the rods upon which the arms 8 and 9 are mounted.

The upper end of the take down frame is provided with a bracket 11, having a hook 12 adapted to engage beneath the collar 13 on the bait handle. When the take down frame swings to the right from the position illustrated in Fig. 1, the bracket 12 moves up and engages the collar 13, disengaging the bait from its support upon the carriage (not shown), and during the further movement of the take down frame, the weight of the cylinder is supported upon the bracket 11 until the take down frame passes its vertical position, after which time more and more of the weight of the cylinder is taken by the arms 8.

The framework 6 is preferably formed from commercial angles 14, secured together by transverse members 15 and lattice members 16. The rods 10, which carry the arms 8, are guided to move through the transverse members 15 and each rod carries at its lower end a sheave or pulley 17. Intermediate such pulleys and mounted upon the frame are the sheaves or pulleys 18. A flexible member, preferably a light wire rope or cable 20, passes around the various sheaves 17 and 18, as indicated in Fig. 1, and around the end pulleys 21, 22, 23 and 24, the pulley 21 being located at the upper end of the take down frame and the pulleys 22, 23 and 24 being located at the lower end of the frame. The cable is thus formed into an endless connection with a bight 25 at the lower end, in which is mounted a sheave 26, supporting a weight 27.

Since the weight imposed upon the arm 9, which engages the bait 4, is greater than the weight imposed upon the other arms, a modified arrangement is provided for supporting the rod 10 of this arm, such arrangement being shown in Fig. 2, and including a lever 28, pivoted at 29 and carrying at its end a pulley 30, around which the cable 20 passes. This arrangement provides for holding forward the arm 9 with greater force than the arms 8, since the point of support 31 of the rod upon the lever 28 is located closer to the pivotal support 29 of the lever than to the free end thereof.

It will be seen that the cable and pulley arrangement as above described constitutes a means for holding the various cylinder supporting arms in advanced position and for equalizing the pressure exerted by the arms upon the cylinder. When the take down frame swings to the right, the arms 8 are successively engaged by the cylinders and moved to the rear, such movement being permitted because of the cable, to which tension is continuously applied by the weight 27. Since the arms are all supported upon the same cable and such cable runs freely around the various pulleys, the pressure exerted by each arm upon the cylinder is substantially the same, and this is the case regardless of any variations in the straightness of the cylinder or its diameter. The cylinder is thus uniformly supported, both during the taking down operation and during the cutting up operation, and breakage incident to strains induced by uneven support of the cylinder is entirely avoided. The arms are limited in their movement by means of the stops 32 and 33 carried upon the rods 10.

Fig. 4 illustrates a modification which involves the division of the cable into a plurality of parts, so that each section of the cable serves to support only a part of the arms on the frame. With a construction such as that of Fig. 1, the arms at the central portion of the frame 6 respond to pressure less readily than those at the ends of the frame, due to the bends in the cable and to the friction in turning the various pulleys, and a construction such as that of Fig. 4 remedies this condition so that all the arms respond to pressure imposed thereon with substantially the same degree of freedom. Fig. 4 shows two sets of arms 34 and 35, mounted upon the frame 36, the set 34 being supported by the cable 37 and the set 35 being supported by the cable 38. A set of pulleys 39 are mounted at the axis of rotation 40 of the frame, and the various cables pass over these pulleys and carry at their ends the weights 41 and 42. The arms 34 and 35 are mounted upon rods similar to those in the construction of Fig. 1 and the arrangement of sheaves and pulleys is similar. The cable 37 is fixedly attached to the frame at 43, while the cable 38 is attached at 44. A large number of different modifications or arrangements might be provided for securing the equalization of the pressure upon the cylinder by subdividing the cable, and it will be understood that Fig. 4 illustrates only one of a number of possible modifications along this line.

Fig. 5 illustrates a modification in which the invention is applied to a cutting up frame or "horse," as opposed to the take down frame of Fig. 1. With this construction the cylinder is swung from vertical to horizontal position by any desired form of take down and placed upon the arms 45 of the frame 46, such frame being supported upon legs 47. A further modification involved in this type of device consists in the elimination of the weights of the previous forms of construction. The cables 48 are secured at their ends 50 to the frame so that no tension is applied to the cables except that incident to the weight imposed upon the arms 45 by the cylinder. The rods 51 carrying the arms 45 and the pulleys 52 and 53, correspond in construction and function to similar parts in the construction of Fig. 1. It will be seen that the cables employed act as equalizing means, as in the other type of construction, and that this equalizing means causes the arms to bear with equal pressure upon the cylinder even though the cylinder is more or less crooked and has a varying diameter. The construction provides for a yielding support of the cylinder and at the same time avoids the complication and unequal pressure incident to the use of springs, such as have heretofore been employed. If desired, the weights of the other types of construction might be employed with the horse of Fig. 5, but such weights are unnecessary since there is no advantage in yieldingly holding the arms forward, such as is the case with a take down frame, where it is desirable to cushion the contact between the arms and cylinder during the swinging movement of the frame.

What I claim is:

1. In combination a supporting frame for glass cylinders, a plurality of arms spaced along the frame and extending transversely thereof, and a flexible equalizing means extending longitudinally of the frame and supporting the series of arms.

2. In combination a supporting frame for glass cylinders, a plurality of arms spaced along the frame and extending transversely thereof, a flexible equalizing means extending along the frame and supporting the series of arms, and means for applying tension to the flexible member tending to hold the arms in advanced position.

3. In combination a supporting frame for glass cylinders, a plurality of arms spaced along the frame and extending transversely thereof, a flexible equalizing means extending along the frame and supporting the series of arms, and means for applying tension to both ends of the flexible member and adapted to hold the arms in advanced position.

4. In combination a supporting frame for glass cylinders, a plurality of arms spaced along the frame and extending transversely thereof, sheaves on the frame intermediate the arms, sheaves connected to the arms, and a flexible equalizing member extending beneath said sheaves and supporting the series of arms.

5. In combination a supporting frame for glass cylinders, a plurality of arms spaced along the frame and extending transversely thereof, sheaves on the frame intermediate the arms, sheaves connected to the arms, a flexible equalizing member extending beneath said sheaves, and means for applying tension to the flexible member for holding the arms in advanced position.

In testimony whereof I have hereunto subscribed my name this 8th day of February, 1919.

HERMAN S. HEICHERT.